Patented Feb. 16, 1954

2,669,560

UNITED STATES PATENT OFFICE 2,669,560

SULFURATION OF MINERAL OIL

Elmer H. Sperry, Drexel Hill, Pa., assignor to Sun Oil Company, Philadelphia, Pa., a corporation of New Jersey No Drawing. Application September 21, 1950, Serial No. 186,101

3 Claims. (Cl. 260—139)

This invention relates to an improved method for causing elemental sulfur to chemically react with mineral oil, and more particularly it relates to a catalytic mineral oil sulfuration method.

It is known in the art to sulfurate mineral oil by contacting elemental sulfur with mineral oil heated to temperatures sufficient to cause sulfur to chemically react with constituents of the mineral oil. Sulfurated mineral lubricating oils thus produced are generally improved in properties such as extreme pressure characteristics, resistance to oxidation, and bearing corrosion inhibition characteristics, and are particularly useful as cutting oils, gear lubricants, turbine oils, internal combustion engine lubricants, etc.

Prior art sulfurations have been capable of incorporating substantial amounts of sulfur in mineral oil, but it is frequently desired to incorporate into mineral oil larger amounts of sulfur than can be incorporated by the prior art sulfurations.

I have discovered that, in processes where elemental sulfur and mineral oil are contacted under conditions such as to effect substantial chemical reaction between the oil and sulfur, it is possible to cause more sulfur to become stably incorporated in the oil by contacting the oil and sulfur in the presence of elemental iodine.

The present invention contemplates the use of iodine in mineral oil sulfurations in order to increase the yield of oil-soluble sulfur-containing products. Accordingly, the conditions under which the sulfuration is conducted are preferably those which, in conjunction with the iodine catalyst, favor the formation of such oil-soluble products to the exclusion of insoluble condensed or polymerized sulfur-containing compounds.

According to the present invention, elemental sulfur is contacted in the presence of iodine with mineral oil at a temperature favoring chemical reaction of sulfur with oil, preferably to form oil-soluble reaction products. Such temperatures vary according to the nature of the mineral oil, but are preferably about 300–400° F. in order to favor formation of oil-soluble products. Temperatures of at least about 250° F. are generally necessary in order to obtain substantial chemical reaction of sulfur with constituents of the oil, rather than mere solution of sulfur in the oil; however, this minimum temperature will vary slightly on either side for different mineral oils.

The weight ratio of oil to sulfur can vary; the sulfur can be used in amounts in excess of that which can be stably incorporated in the oil, or it can be used in amounts such that there is no excess of sulfur. In the former instance, excess elemental sulfur can be removed from the sulfurated mineral oil product by suitable means such as settling and filtration, solvent refining etc. In either instance, the product can if desired be solvent refined in order to remove certain types of sulfur compound products which may be undesired in the product. Suitable solvents for separating sulfur compounds according to type may be phenol, cresol, furfural, dichloroethyl ether, nitrobenzene, aniline, liquid sulfur dioxide, etc. The time of contact of reactants in the present process varies widely with the sulfuration temperature and other conditions and is advantageously about 1–10 hours, preferably about 2–5 hours. The sulfuration is preferably conducted at atmospheric pressure, but it is within the scope of the invention to use elevated pressure, e. g. up to about 150 pounds per square inch gauge.

When contacting sulfur, iodine, and oil according to the present invention, the iodine is present in a catalytic amount, i. e. an amount sufficient to increase substantially the amount of sulfur which combines chemically with the oil. The relative proportions of mineral oil, sulfur, and iodine are advantageously within the following approximate ranges:

| | Parts by weight |
|---|---|
| Mineral oil | 85–99.5 |
| Sulfur | 0.5–15 |
| Iodine | 0.001–0.4 |

Preferred ranges of proportions are as follows:

| | |
|---|---|
| Mineral oil | 90–97 |
| Sulfur | 3–10 |
| Iodine | 0.005–0.02 |

The sulfuration method of the present invention is applicable to mineral oil generally, preferably to distillate mineral oil having properties making it suitable for use as a cutting oil, such properties for example as: S. U. viscosity at 100° F. of at least about 50 seconds, preferably 70–200 seconds.

The following examples illustrate the invention:

EXAMPLE I

The oil which was sulfurated in this example was a blend of 50 parts by volume of lubricating distillate obtained from naphthenic base crude petroleum, the distillate having A. P. I. gravity of 22.3 and S. U. viscosity at 100° F. of 110 seconds, and 50 parts by volume of a highly aromatic extract obtained in the solvent refining of distillate lubricating oil from mixed-base crude petroleum. The blend had bromine number, as determined according to the method specified in A. S. T. M. Test 875-46T, of about 8.9.

One portion of the oil blend described above was mixed with sulfur flour in the following approximate portions:

Reaction mixture 1

Parts by weight
Oil --------------------------------- 90
Sulfur ------------------------------ 10

Another portion of the oil blend was mixed with sulfur flour and solid elemental iodine in the following approximate proportions:

Reaction mixture 2

Oil --------------------------------- 90
Sulfur ------------------------------ 10
Iodine ------------------------- 0.005-0.01

Both portions were agitated for two hours at 325-335° F., then allowed to stand at about 35° F. for four weeks, and filtered to remove excess sulfur and other solids if present. The following were the sulfur contents (A. S. T. M. D129-49) of the respective oil filtrates:

Weight per cent sulfur
(1) Absence of iodine--------------------- 2.6
(2) Presence of iodine--------------------- 3.8

This example shows that the presence of catalytic amounts of iodine in mineral oil sulfuration causes a substantial increase in the amount of sulfur which becomes stably incorporated in the oil.

EXAMPLE II

The oil which was sulfurated in this example was a lubricating distillate obtained from naphthenic base crude petroleum, the distillate having A. P. I. gravity of 21.9, S. U. viscosity at 100° F. of 160 seconds, and bromine number of about 5.2.

One portion of this oil was mixed with sulfur flour in the following approximate proportions:

Reaction mixture 3

Oil --------------------------------- 97
Sulfur ------------------------------ 3

Another portion of this oil was mixed with sulfur flour and with solid elemental iodine in the following approximate proportions:

Reaction mixture 4

Oil --------------------------------- 97
Sulfur ------------------------------ 3
Iodine ------------------------- 0.005-0.01

Both portions were agitated for two hours at 300° F., allowed to stand for two weeks at about 20° F., then filtered. The following were the sulfur contents of the respective filtrates:

Weight per cent sulfur
(3) Absence of iodine--------------------- 1.8
(4) Presence of iodine--------------------- 2.1

This example shows that iodine has an advantageous effect in sulfuration, under different conditions from those employed in Example I, of a somewhat different mineral oil stock.

I claim:

1. The method of sulfurating mineral lubricating oil which comprises: contacting mineral lubricating oil in liquid phase at about 250-400° F. with elemental sulfur in the presence of elemental iodine.

2. The method of sulfurating mineral lubricating oil which comprises: contacting about 85-99.5 parts by weight of mineral lubricating oil in liquid phase at about 250-400° F. with about 0.5-15 parts of elemental sulfur in the presence of about 0.001-0.4 part of elemental iodine.

3. Method according to claim 2 wherein said mineral lubricating oil originally has bromine number less than about 10.

ELMER H. SPERRY.

References Cited in the file of this patent

UNITED STATES PATENTS

| Number | Name | Date |
|---|---|---|
| 1,929,955 | Nelson | Oct. 10, 1933 |
| 2,093,752 | Duecker et al. | Sept. 21, 1937 |

FOREIGN PATENTS

| Number | Country | Date |
|---|---|---|
| 431,976 | Great Britain | July 18, 1935 |